United States Patent
Qiu et al.

(10) Patent No.: US 8,332,514 B2
(45) Date of Patent: Dec. 11, 2012

(54) METHODS AND APPARATUS FOR LOAD BALANCING IN COMMUNICATION NETWORKS

(75) Inventors: Chaoxin Charles Qiu, Austin, TX (US); William R J Chorley, Spicewood, TX (US); Robert F Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1512 days.

(21) Appl. No.: 11/781,002

(22) Filed: Jul. 20, 2007

(65) Prior Publication Data

US 2009/0022298 A1      Jan. 22, 2009

(51) Int. Cl.
*G06F 15/173*     (2006.01)
*G06F 9/46*       (2006.01)

(52) U.S. Cl. ................................. 709/226; 718/105
(58) Field of Classification Search .................. 709/226; 718/105
See application file for complete search history.

(56) References Cited

U.S. PATENT DOCUMENTS

| | | | |
|---|---|---|---|
| 6,128,279 A | 10/2000 | O'Neil et al. | |
| 6,671,259 B1 | 12/2003 | He et al. | |
| 7,065,339 B2 | 6/2006 | Vallinen et al. | |
| 7,181,211 B1 | 2/2007 | Phan-Anh | |
| 7,184,415 B2 | 2/2007 | Chaney et al. | |
| 7,412,521 B2 * | 8/2008 | Olson et al. | 709/227 |
| 2003/0069968 A1 | 4/2003 | O'Neil et al. | |
| 2003/0093560 A1 | 5/2003 | Ono et al. | |
| 2003/0229697 A1 | 12/2003 | Borella | |
| 2004/0068574 A1 | 4/2004 | Costa Requena et al. | |
| 2004/0152469 A1 * | 8/2004 | Yla-Outinen et al. | 455/453 |
| 2004/0205192 A1 * | 10/2004 | Olson et al. | 709/227 |
| 2005/0136926 A1 | 6/2005 | Tammi et al. | |
| 2006/0013147 A1 * | 1/2006 | Terpstra et al. | 370/252 |
| 2006/0064478 A1 * | 3/2006 | Sirkin | 709/223 |
| 2006/0083242 A1 * | 4/2006 | Pulkkinen | 370/392 |
| 2006/0167978 A1 * | 7/2006 | Ozugur et al. | 709/203 |
| 2006/0174009 A1 | 8/2006 | Martiquet et al. | |
| 2006/0242300 A1 * | 10/2006 | Yumoto et al. | 709/226 |
| 2006/0253538 A1 | 11/2006 | Jung et al. | |
| 2007/0055874 A1 | 3/2007 | Phan-Anh et al. | |
| 2007/0086582 A1 | 4/2007 | Tai et al. | |
| 2007/0088836 A1 | 4/2007 | Tai et al. | |
| 2008/0101335 A1 * | 5/2008 | Badger | 370/352 |
| 2008/0275943 A1 * | 11/2008 | Grayson et al. | 709/203 |
| 2009/0094611 A1 * | 4/2009 | Danne et al. | 718/105 |

* cited by examiner

*Primary Examiner* — Asghar Bilgrami
(74) *Attorney, Agent, or Firm* — Hanley, Flight & Zimmerman, LLC

(57) ABSTRACT

Methods and apparatus for load balancing in communication networks are disclosed. An example method to perform load balancing in a communication network disclosed herein comprises routing a registration request received for a user device in an Internet protocol multimedia subsystem network to a first call processor when the user device is registered with the first call processor and in an active call session with the first call processor, and querying a load balancer to determine whether to assign the user device to at least one of the first call processor or a second call processor when the user device is registered with the first call processor but not in any active call sessions with the first call processor.

19 Claims, 9 Drawing Sheets

METHODS AND APPARATUS FOR LOAD BALANCING IN COMMUNICATION NETWORKS

FIELD OF THE DISCLOSURE

This disclosure relates generally to communication networks and, more particularly, to methods and apparatus for load balancing in communication networks.

BACKGROUND

In a typical Internet protocol multimedia subsystem (IMS) network, each user device must register with the IMS network to receive services. Upon initial registration with the IMS network, a user device is assigned to a particular serving call session control function (S-CSCF), which will act as a call server for the user device. Additionally, a secured bound is established between the user device and the assigned S-CSCF. In a conventional IMS network, the established bound between the user device and the assigned S-CSCF will not change provided that the user device continues to re-register with the IMS network at appropriate intervals. As such, conventional IMS networks exhibit a fairly static allocation of user devices to particular S-CSCFs.

DETAILED DESCRIPTION

Figure 1:
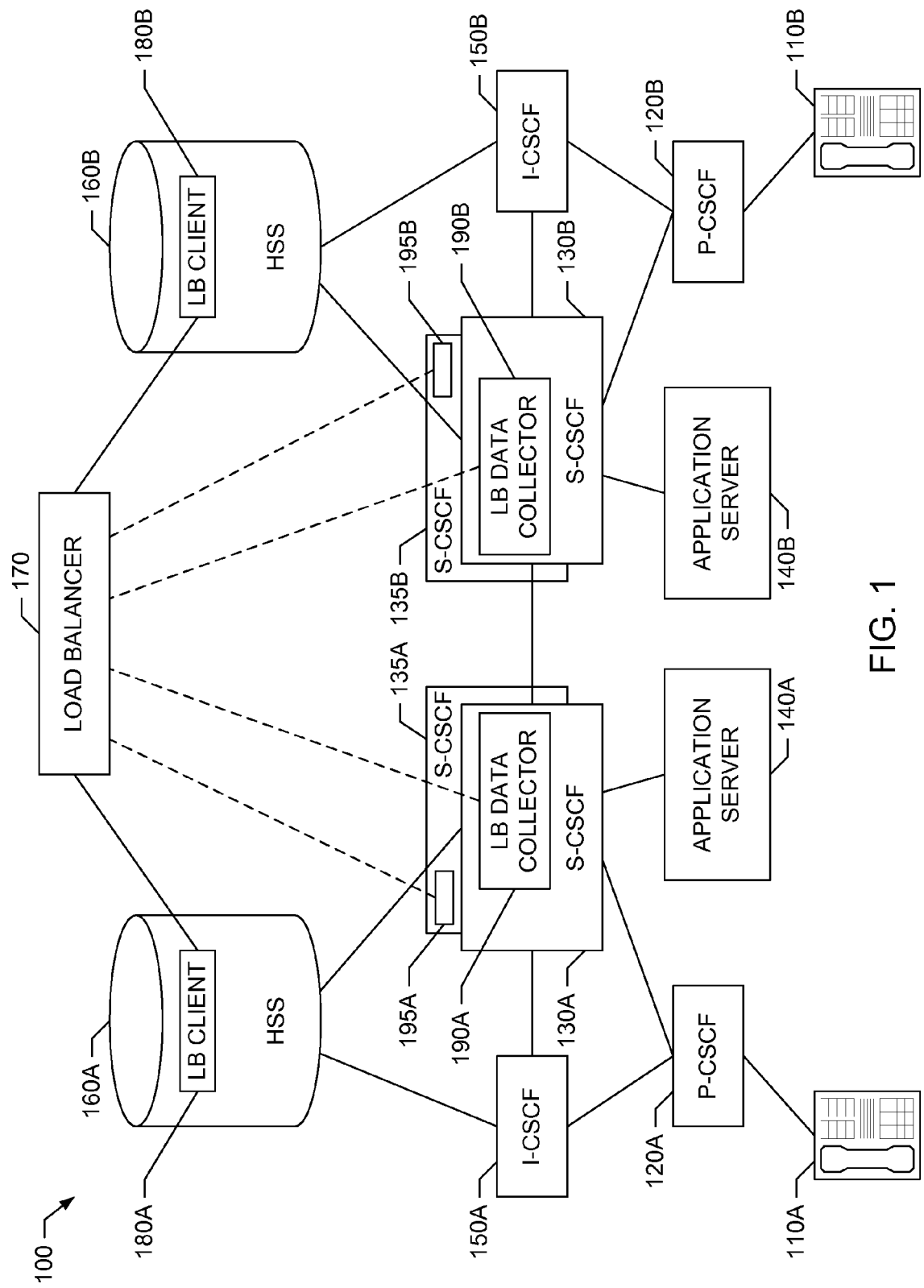
FIG. 1 is a block diagram of an example communication network employing load balancing.

A block diagram of an example communication network 100 employing load balancing according to the methods and apparatus disclosed herein is shown in FIG. 1. The example communication network 100 implements an Internet protocol multimedia subsystem (IMS) network and includes various call processors and servers to, for example, manage calls and sessions, provide multimedia functionality, etc., for user devices (also known as user endpoints or UEs), such as the user devices 110A and 110B shown in FIG. 1. IMS networks may be used in a variety of applications, such as, for example, to implement mobile communication networks, voice over Internet protocol (VoIP) communication networks, etc. Load balancing in the example communication network 100 can improve utilization of the various call processor and servers by avoiding congestion and overload situations. Although the illustrated example depicts the communication network 100 as an IMS network, the example load balancing methods and apparatus disclosed herein are not limited to application only in IMS networks. For example, the load balancing methods and apparatus disclosed herein may be readily adapted for use in any communication network in which user devices are assigned to one or more resources (e.g., such as call processors, servers, etc.)

To implement an IMS network, the example communication network 100 includes proxy call session control functions (P-CSCFs) 120A and 120B. The P-CSCFs 120A and/or 120B may be implemented by one or more servers programmed with machine readable instructions, and each such server may include one or more processors for executing instructions stored in a machine readable memory. Generally, P-CSCFs are call processors that provide an interface for routing signaling messages to appropriate destinations in an IMS network. In the illustrated example, the P-CSCF 120A provides a session initiation protocol (SIP) proxy interface for signaling messages between the user device 110A and the rest of the communication network 100. Similarly, the P-CSCF 120B provides a SIP proxy interface for signaling messages between the user device 110B and the rest of the communication network 100. P-CSCFs 120A and 120B are assigned to the user devices 110A and 110B, respectively, when each of the user devices 110A and 110B initially registers with the communication network 100. After assignment, the P-CSCFs 120A and 120B route signaling messages from the user devices 110A and 110B, respectively, to the appropriate destination(s) in the example communication network 100.

Additionally, the example communication network 100 includes serving CSCFs (S-CSCFs) 130A, 130B, 135A and 135B to allow the user devices 110A and 110B to register with the example IMS communication network 100. Furthermore, the S-CSCFs 130A and 135A allow access to the application server 140A, and the S-CSCFs 130B and 135B allow access to the application server 140B. The S-CSCFs 130A, 130B, 135A and/or 135B may be implemented by one or more servers programmed with machine readable instructions, and each such server may include one or more processors for executing instructions stored in a machine readable memory. Generally, S-CSCFs are call processors that act as registrars for registering user devices with an IMS network. S-CSCFs also route signaling messages to corresponding application servers in an IMS network. In the illustrated example, S-CSCF 130A is depicted as being assigned to user device 110A and, thereby, providing a SIP server for registering the user device 110A with the example communication network 100 and providing access to an application server 140A. Similarly, S-CSCF 130B is depicted as being assigned to user device 110B and, thereby, providing a SIP server for registering the user device 110B with the example communication network 100 and providing access to an application server 140B.

The application servers 140A and 140B of the illustrated example are configured to host and execute one or more services accessible by, for example, the user devices 110A and 110B. Services that may be hosted and executed by the application servers 140A and 140B include, but are not limited to, value-added call processing services (e.g., such as caller identification (ID), call forwarding, call waiting, teleconferencing, voicemail, etc.), multimedia services (e.g., such as multimedia conferencing, media content provisioning, speech recognition services, etc.), etc. In the communication network 100 of the illustrated example, multiple S-CSCFs can provide access to a single application server. In particular, the S-CSCFs 130A and 135A provide access to the application server 140A, and the S-CSCFs 130B and 135B provides access to the application server 140B. However, in some example implementations, a single S-CSCF may provide access to a single application server and/or a single S-CSCF may provide access to multiple application servers.

To enable S-CSCFs (e.g., such as the S-CSCFs 130A and 130B) to be assigned to user devices (e.g., such as the user devices 110A and 110B), the example communication network 100 includes interrogating CSCFs (I-CSCFs) 150A and 150B, and home subscriber servers (HSSs) 160A and 160B. The I-CSCFs 150A and/or 150B may be implemented by one or more servers programmed with machine readable instructions, and each such server may include one or more processors for executing instructions stored in a machine readable memory. The HSSs 160A and/or 160B may also be implemented by one or more servers programmed with machine readable instructions, and each such server may include one or more processors for executing instructions stored in a machine readable memory. Generally, an I-CSCF is a call processor that provides an intermediate signaling interface in an IMS network to route registration requests from a user device to an appropriate HSS. The HSS, in turn, assigns an S-CSCF to the user device for subsequent call processing based on, for example, profile information, location information, etc., corresponding to the user device and stored in the HSS. In the illustrated example, the I-CSCF 150A interfaces with the HSS 160A which, in turn, assigns user devices (e.g., such as the user device 110A) to one or more of the S-CSCFs 130A and 135A. Similarly, the I-CSCF 150B interfaces with the HSS 160B which, in turn, assigns user devices (e.g., such as the user device 110B) to one or more of the S-CSCFs 130B and 135B.

As mentioned previously, in a conventional IMS network, the assignment of a particular user device to a particular S-CSCF is fairly static. However, because call arrivals associated with the user devices in an IMS network vary dynamically, the static allocation of user devices to S-CSCFs can result in unbalanced S-CSCF workloads. For example, some S-CSCFs can become overloaded while other S-CSCFs can be underutilized. To provide load balancing functionality according to the methods and apparatus disclosed herein, the example communication network 100 further includes a load balancer 170, load balancer clients 180A and 180B, and load balancer data collectors 190A, 190A, 195A and 195B. Generally, the load balancer 170 assigns user devices to particular S-CSCFs to balance the load of the various S-CSCFs in the example communication network 100. In the illustrated example, the load balancer 170 responds to assignment requests from the HSS 160A to determine whether to assign a user device (e.g., such as the user device 110A) to, for example, the S-CSCF 130A or the S-CSCF 135A. Similarly, the load balancer 170 responds to assignment requests from the HSS 160B to determine whether to assign a user device (e.g., such as the user device 110B) to, for example, the S-CSCF 130B or the S-CSCF 135B.

The load balancer clients 180A and 180B are included in the example communication network 100 to send the assignment requests to the load balancer 170 in response to certain signaling messages received by the HSSs 160A and 160B. The noted signaling messages correspond to registration (and/or re-registration) requests made by user devices in the network (e.g., such as the user devices 110A and 110B). The load balancer clients 180A and 180B also process the resulting S-CSCF assignments received from the load balancer 170. For example, in the case of an assignment of a user device (e.g., the user device 110A) from a first S-CSCF (e.g., such as the S-CSCF 130A) to a second S-CSCF (e.g., such as the S-CSCF 135A), the load balancer client 180A will process the assignment from the load balancer and route a registration request to the second S-CSCF to begin registration of the user device with the second S-CSCF. Additionally, the load balancer client 180A will route a de-registration request to the first S-CSCF to terminate the existing registration of the user device with the first S-CSCF. In the illustrated example, the load balancer clients 180A and 180B are depicted as implemented in the HSSs 160A and 160B, respectively. In other example networks, the load balancer clients 180A and 180B could be implemented as separate devices from or co-processors to the HSSs 160A and 160B, respectively.

To determine which S-CSCF should be assigned to a particular user device, the load balancer 170 of the illustrated example performs load balancing based on performance data collected by the load balancer data collectors 190A, 190B, 195A and 195B. The performance data collected by the load balancer data collectors 190A, 190B, 195A and 195B characterizes the performance of the S-CSCFs 130A, 130B, 135A and 135B, respectively. As such, the performance data may correspond to, for example, a number of registered accounts, a number of connections, a call arrival rate, a utilization percentage, etc., associated with a particular S-CSCF. The load balancer 170 may use any load distribution algorithm to process the performance data collected by the load balancer data collectors 190A, 190B, 195A and 195B to determine how to assign S-CSCFs to particular user devices. In the illustrated example, the load balancer data collectors 190A, 190B, 195A and 195B are depicted as implemented in the S-CSCFs 130A, 130B, 135A and 135B, respectively. In other example networks, the load balancer data collectors 190A, 190B, 195A and 195B could be implemented as separate devices from or co-processors to the S-CSCFs 130A, 130B, 135A and 135B, respectively.

Figure 2:
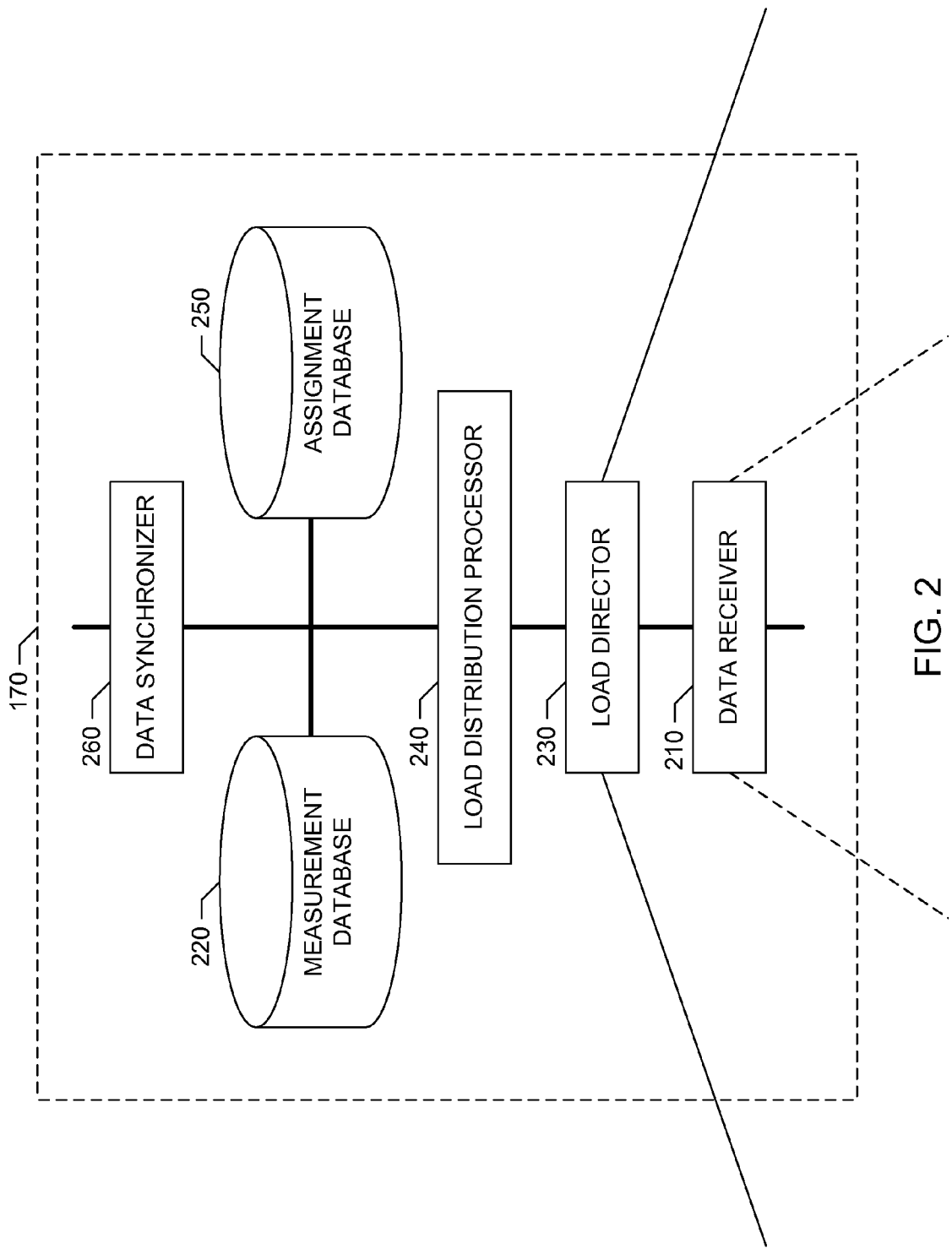
FIG. 2 is a block diagram of an example load balancer that may be used to implement the example communication network of FIG. 1.

An example implementation of the load balancer 170 included in the example communication network 100 of FIG. 1 is illustrated in FIG. 2. The example load balancer 170 of FIG. 2 includes a data receiver 210 to receive performance data collected by the data collectors associated with the S-CSCFs managed by the load director 170. For example, and referring to the example communication network 100 of FIG. 1, the data receiver 210 may be configured to receive performance data collected by the load balancer data collectors 190A, 190B, 195A and 195B associated, respectively, with the S-CSCFs 130A, 130B, 135A and 135B. Furthermore, the data receiver 210 may be configured to receive the performance data sent by the load balancer data collectors 190A, 190B, 195A and/or 195B at predetermined time intervals (e.g., such as periodically). Additionally or alternatively, the data receiver 210 may be configured to poll the load balancer data collectors 190A, 190B, 195A and/or 195B to obtain the corresponding performance data. The performance data received by the data receiver 210 is then stored in a measurement database 220 for subsequent processing.

The example load balancer 170 of the illustrated example also includes a load director 230 to receive and process assignment requests to assign user devices to S-CSCFs. For example, and referring to the example communication network 100 of FIG. 1, the load director 230 may be configured to receive assignment requests from the load balancer clients 180A and 180B associated, respectively, with the HSSs 160A and 160B. Furthermore, in some example implementations the load director 230 may be implemented under an expectation that an assignment request corresponding to a particular user device will be received only when the user device is not in an active call session with any S-CSCF. Additionally, the load director 230 of the illustrated example sends responses to the assignment requests to indicate the S-CSCF assignments determined by the example load balancer 170. For example, and referring to the example communication network 100, the load director 230 may be configured to send S-CSCF assignment responses to the load balancer clients 180A and 180B associated, respectively, with the HSSs 160A and 160B.

To determine which S-CSCF to assign to a user device in response to an assignment request received by the load director 230, the example load balancer 170 of FIG. 2 includes a load distribution processor 240. The load distribution processor 240 implements any load distribution algorithm or algorithms to process the performance data stored in the measurement database 220 to determine how to assign S-CSCFs to particular user devices. For example, an example load balancing algorithm implemented by the load distribution processor 240 may assign user devices to S-CSCFs such that the loading of the various S-CSCFs in the example communication network 100 is balanced as measured by performance data corresponding to any or all of a number of registered accounts, a number of connections, a call arrival rate, a utilization percentage, etc., and/or any combination thereof. Furthermore, the load distribution processor 240 may be configured to be upgradeable such that load distribution algorithm enhancements and/or new algorithms may be implemented as they become available. Upon determining an S-CSCF assignment for a particular user device, the load distribution processor 240 stores information describing the assignment of the user device to the S-CSCF in an assignment database 250.

Operation of the load distribution processor 240 in the illustrated example can also be tailored to bias assignment of S-CSCFs to user devices based on certain configurable preferences. For example, the load distribution processor 240 may be configured to bias its S-CSCF assignments such that an S-CSCF to which a particular user device is already assigned is preferred over assignment of the user device to another S-CSCF. Under such a configuration, the load distribution processor 240 will access the information stored in the assignment database 250 and attempt to reassign a user device to an S-CSCF already assigned to the user device unless, for example, that S-CSCF is currently overloaded. In another example, the load distribution processor 240 may be configured to bias its S-CSCF assignments such that user devices are assigned to S-CSCFs in their home realm (e.g., such as a home subscriber network, home geographic location, etc.), if possible (e.g., if an S-CSCF in the home realm is not currently overloaded). To support such a configuration, information identifying which S-CSCFs are located in the home realm of a particular user device may also be stored in the assignment database 250.

The example load balancer 170 of FIG. 2 further includes a data synchronizer 260 to share and synchronize performance data collected by other load balancers 170 in the communication network 100. For example, the data synchronizer 260 may be configured to provide performance data stored in the measurement database 220 to one or more other load balancers 170 in the communication network 100. Additionally or alternatively, the data synchronizer 260 may be configured to obtain performance data from one or more other load balancers 170 in the communication network 100 for storage in the measurement database 220. In some example implementations, the data synchronizers 260 of multiple load balancers 170 are configured in a meshed topology to allow each data synchronizer 260 to synchronize performance data with every other data synchronizer 260. In other example implementations, the data synchronizers 260 of multiple load balancers 170 are configured in a star topology such that one data synchronizer 260 acts as a central synchronizer to which all other data synchronizers 260 synchronize their performance data. Of course, other topologies may also be implemented depending on the requirements of a particular communication network.

Figure 3:
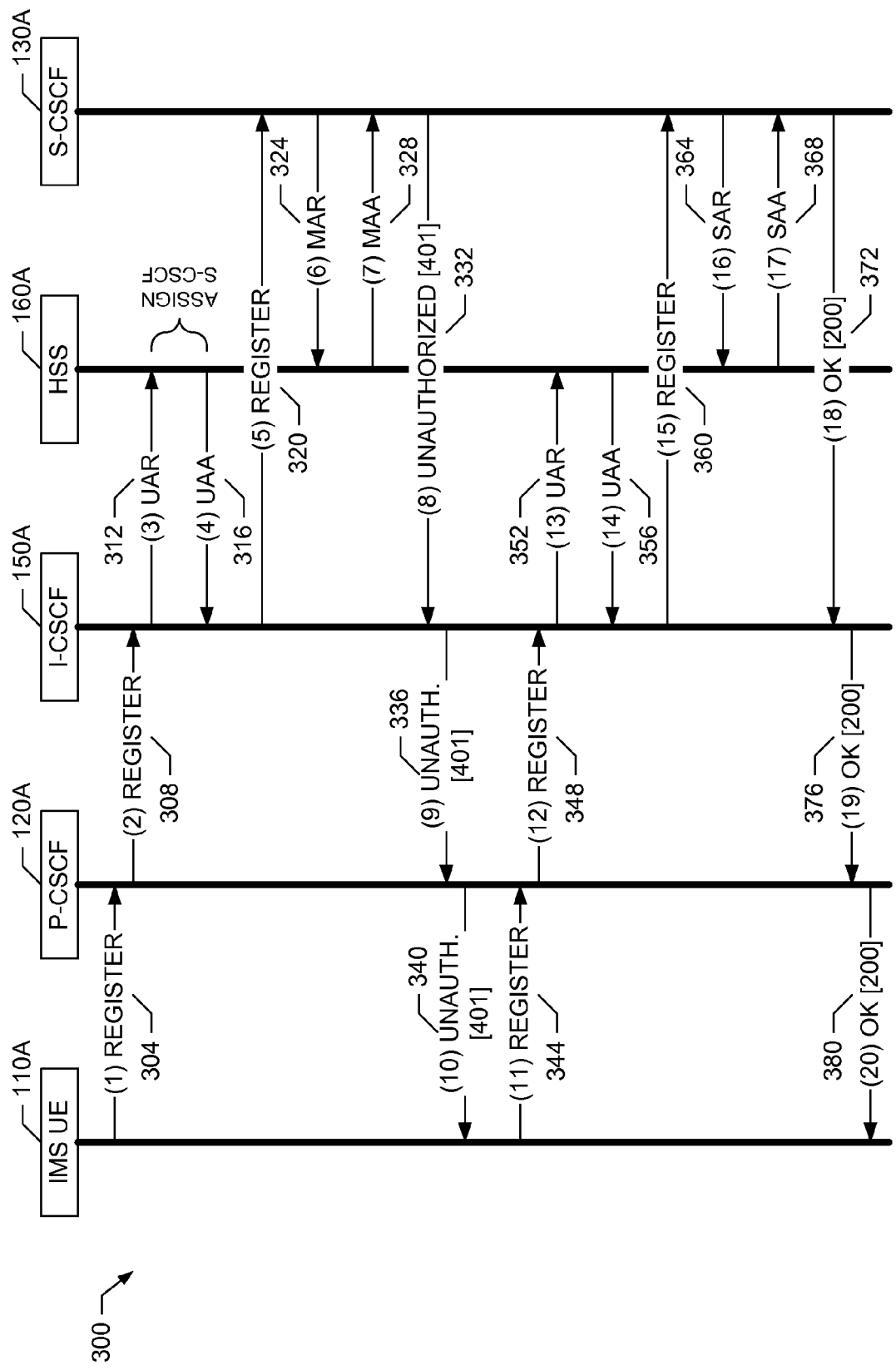
FIG. 3 is a message sequence diagram illustrating an example prior art user device initial registration procedure that could be performed by the example communication network of FIG. 1.

To provide a context to more fully illustrate load balancing as implemented in the example communication network 100 of FIG. 1, a message sequence diagram 300 illustrating an example prior art user device initial registration procedure which could be implemented by the example communication network 100 is shown in FIG. 3. The example message sequence diagram 300 begins with the user device 110A initiating a registration attempt with the communication network 110A by issuing a registration request 304 that is received by the P-CSCF 120A. For example, the registration request 304 may correspond to a SIP REGISTER request 304 from the user device 110A to the P-CSCF 120A. Next, because the user device 110A is not yet registered with the communication network, the P-CSCF 120A continues routing the registration request to the I-CSCF 150A as a registration request 308. For example, the registration request 308 may correspond to another SIP REGISTER request 308 from the P-CSCF 120A to the I-CSCF 150A.

To obtain an assignment of an appropriate S-CSCF to the user device 110A in response to its initial registration request, the I-CSCF 150A continues routing the registration request by sending an authentication request query to the HSS 160A. For example, the I-CSCF 150A may route the registration request by sending an authentication request 312, such as a DIAMETER User Authentication Request (UAR) command 312, to the HSS 160A. In the illustrated example, the authentication request 312 (e.g., corresponding to the UAR command 312) is a request to authorize the registration of the user device 110A. In response to receiving the authentication request 312, the HSS 160A assigns an S-CSCF to the user device 110A. In the illustrated example, the HSS 160A assigns S-CSCF 130A to the user device 110A. Next, the HSS 160A sends an authentication answer 316, such as a DIAMETER User Authentication Answer (UAA) command 316, to the I-CSCF 150A indicating an assignment of S-CSCF 130A to the user device 110A. The I-CSCF 150A, in turn, continues routing the registration request to the S-CSCF 130A as a registration request 320 using the assignment information included in the received authentication answer 316. For example, the registration request 320 may correspond to another SIP REGISTER request 320 from the I-CSCF 150A to the S-CSCF 130A.

In response to receiving the registration request 320 corresponding to the user device 110A, the S-CSCF 130A sends an authentication request 324, such as a DIAMETER Multimedia Authentication Request (MAR) command 324, to the HSS 160A. In the illustrated example, the authentication request 324 (e.g., corresponding to the MAR command 324) is a request to obtain security information for authenticating the user device 110A. The HSS 160A responds to the authentication request 324 (e.g., corresponding to the MAR command 324) with an authentication answer 328, such as a DIAMETER Multimedia Authentication Answer (MAA) command 328. The authentication answer 328 (e.g. corresponding to the MAA command 328) includes the requested security information associated with the user device 110A.

To cause the user device 110A to authenticate with the S-CSCF 130A to complete the registration process, the S-CSCF 130A returns an authentication challenge 332 to the I-CSCF 150A which includes security information for the user device 110A to perform authentication. For example, the authentication challenge 332 may correspond to a SIP 401 response 332 from the S-CSCF 130A to the I-CSCF 150A. The I-CSCF 150A, in turn, returns a similar authentication challenge 336 to the P-CSCF 120A. For example, the authentication challenge 336 may correspond to a SIP 401 response 336 from the I-CSCF 150A to the P-CSCF 120A. In response, the P-CSCF 120A returns another authentication challenge 340 to the user device 110A which includes the security information required for the user device 110A to perform authentication with the S-CSCF 130A. For example, the authentication challenge 340 may correspond to a SIP 401 response 340 from the P-CSCF 120A to the user device 110A.

Next, in response to receiving the authentication challenge 340 to its first registration request 304, the user device 110A substantially repeats the previous registration procedure. However, the registration procedure is now directed to the assigned S-CSCF 130A and with the appropriate authentication information (received via the authentication challenge 340) to enable authentication with the S-CSCF 130A. As such, the user device 110A issues another registration request 344 that is received by the P-CSCF 120A. For example, the registration request 344 may correspond to a SIP REGISTER request 344 from the user device 110A to the P-CSCF 120A. Next, because the user device 110A has not yet completed registration with the communication network 100, the P-CSCF 120A routes the registration request to the I-CSCF 150A as a registration request 348. For example, the registration request 348 may correspond to another SIP REGISTER request 348 from the P-CSCF 120A to the I-CSCF 150A.

To complete authentication of the user device 110A with the assigned S-CSCF 130A, the I-CSCF 150A routes the registration request by sending an authentication request query to the HSS 160A. For example, the I-CSCF 150A may route the registration request by sending an authentication request 352, such as a UAR command 352, to the HSS 160A. In response to receiving the authentication request 352, the HSS 160A sends an authentication answer 356, such as a UAA command 356, to the I-CSCF 150A indicating the existing assignment of the S-CSCF 130A to the user device 110A. The I-CSCF 150A, in turn, routes the registration request to the assigned S-CSCF 130A as a registration request 360. For example, the registration request 360 may correspond to another SIP REGISTER request 360 from the I-CSCF 150A to the S-CSCF 130A.

In response to receiving the registration request 360 with the appropriate authentication information corresponding to the user device 110A, the S-CSCF 130A sends an assignment request 364, such as a DIAMETER Server Assignment Request (SAR) command 364, to the HSS 160A. In the illustrated example, the assignment request 364 (e.g., corresponding to the SAR command 364) is a request to store the authenticated assignment of the S-CSCF 130A with the user device 110A. The HSS 160A responds to the assignment request 364 (e.g., corresponding to the SAR command 364) with an assignment answer 368, such as a DIAMETER Server Assignment Answer (SAA) command 368. The authentication answer 368 (e.g. corresponding to the SAA command 368) includes information indicating that the authenticated assignment of the S-CSCF 130A with the user device 110A was successfully stored, as well as any other information that the S-CSCF 130A needs to provide service to the user device 110A.

To indicate the successful authentication of the user device 110A with the S-CSCF 130A, the S-CSCF 130A returns a positive final response 372 to the I-CSCF 150A which includes, for example, information for the user device 110A to maintain authentication by performing subsequent re-registrations at appropriate time intervals. For example, the positive final response 372 may correspond to a SIP 200 response 372 from the S-CSCF 130A to the I-CSCF 150A. The I-CSCF 150A, in turn, returns a similar positive final response 376 to the P-CSCF 120A. For example, the positive final response 376 may correspond to a SIP 200 response 376 from the I-CSCF 150A to the P-CSCF 120A. In response, the P-CSCF 120A returns another positive final response 380 to the user device 110A which indicates that authentication with the S-CSCF 130A was successful and which includes, for example, the information needed for the user device 110A to maintain authentication with the S-CSCF 130A. For example, the positive final response 380 may correspond to a SIP 200 response 380 from the P-CSCF 120A to the user device 110A. The user device 110A is then registered with the example communication network 100 and the example message sequence diagram 300 ends.

Figure 4:
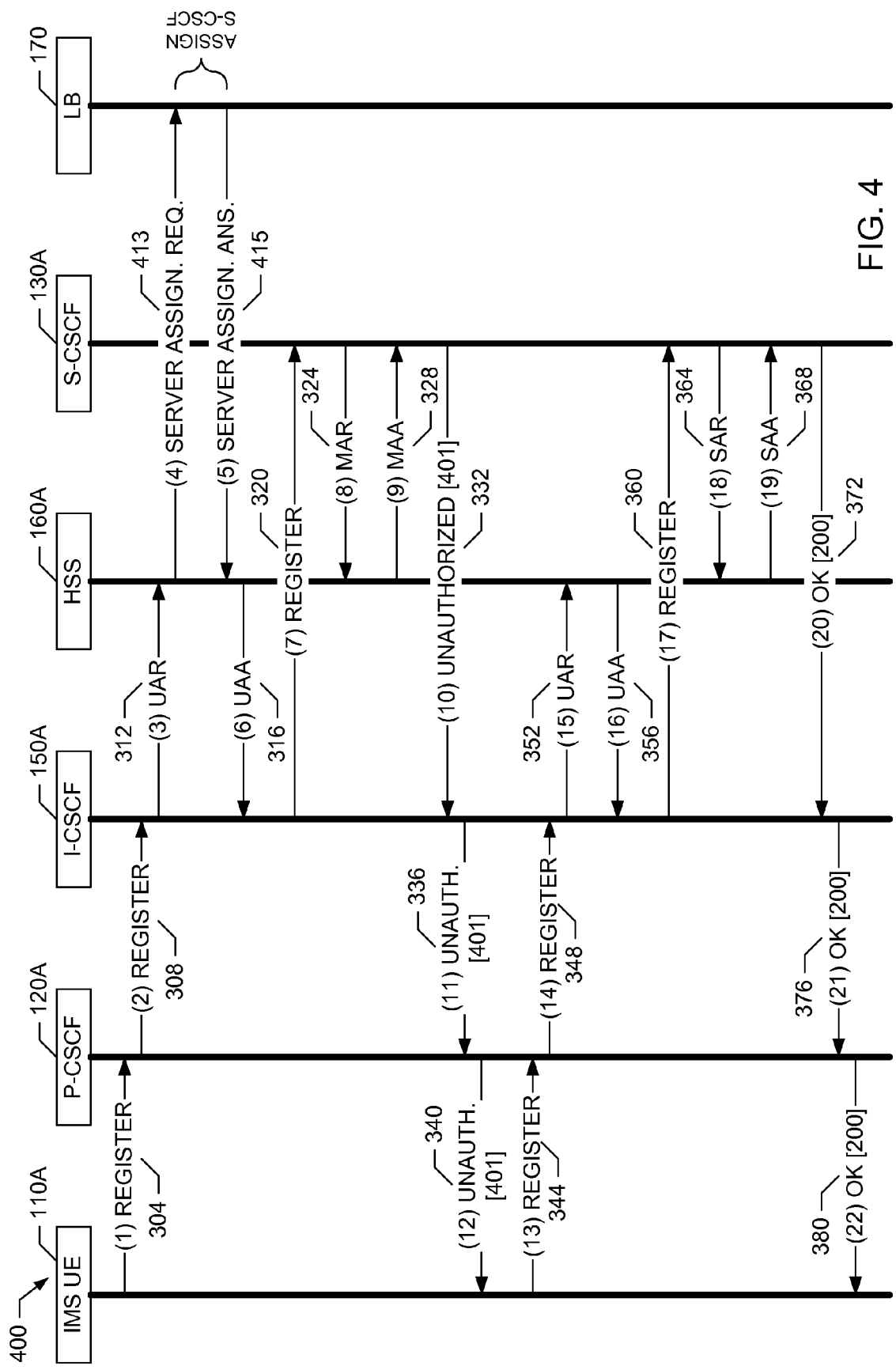
FIG. 4 is a message sequence diagram illustrating an example user device initial registration procedure employing load balancing that may be performed by the example communication network of FIG. 1.

In light of the background provided by the example prior art initial registration message sequence diagram 300 of FIG. 3, a message sequence diagram 400 illustrating an example user device initial registration procedure employing load balancing that may be implemented by the example communication network 100 of FIG. 1 is shown in FIG. 4. The message sequence diagram 400 illustrating the example initial registration procedure employing load balancing builds upon the message sequence diagram 300 illustrating the example prior art initial registration procedure. As such, similar messages in the example message sequence diagrams 300 and 400 are labeled with the same reference numerals. Detailed descriptions of these similar messages are provided above in connection with the description of FIG. 3 and, for brevity, are not repeated in connection with the description of FIG. 4.

Turning to FIG. 4, the example message sequence diagram 400 begins similar to the example message sequence diagram 300 of FIG. 3 with the user device 110A initiating a registration attempt with the communication network 110A by issuing the registration request 304 that is received by the P-CSCF 120A. The message sequence diagram 400 then proceeds in a similar fashion as the message sequence diagram 300 described above until the I-CSCF 150A routes the registration request by sending an authentication request 312, such as a UAR command 312, to the HSS 160A to obtain an assignment of an appropriate S-CSCF to the user device 110A. The HSS 160A, in response to the received authentication request 312, determines that the user device 160A is not yet assigned to an S-CSCF. However, unlike the example message sequence diagram 300 in which the HSS 160A itself determines the S-CSCF assignment, in the example message sequence diagram 400 the HSS 160A sends a query 413 to the load balancer 170 to obtain an S-CSCF assignment for the user device 160A. For example, the query 413 may take the form of a server assignment request 413.

In response to receiving the query 413 (e.g., such as the server assignment request 413), the load balancer 170 employs one or more load balancing algorithms as discussed above in connection with FIG. 2 to determine which S-CSCF to assign to the user device 110A. In the illustrated example, the load balancer 170 assigns S-CSCF 130A to the user device 110A. Next, the load balancer 170 sends a query response 415, such as a server assignment answer 415, to the HSS 160A indicating the assignment of the S-CSCF 130A to the user device 110A. The HSS 160A, in turn, sends the authentication answer 316, such as the UAA command 316, to the I-CSCF 150A indicating the assignment of the S-CSCF 130A to the user device 110A. The example message sequence diagram 400 then proceeds similar to the example message sequence diagram 300 of FIG. 3, ending with the user device 110A being registered with the example communication network 100. The example message sequence diagram 400 then ends.

Figure 5:
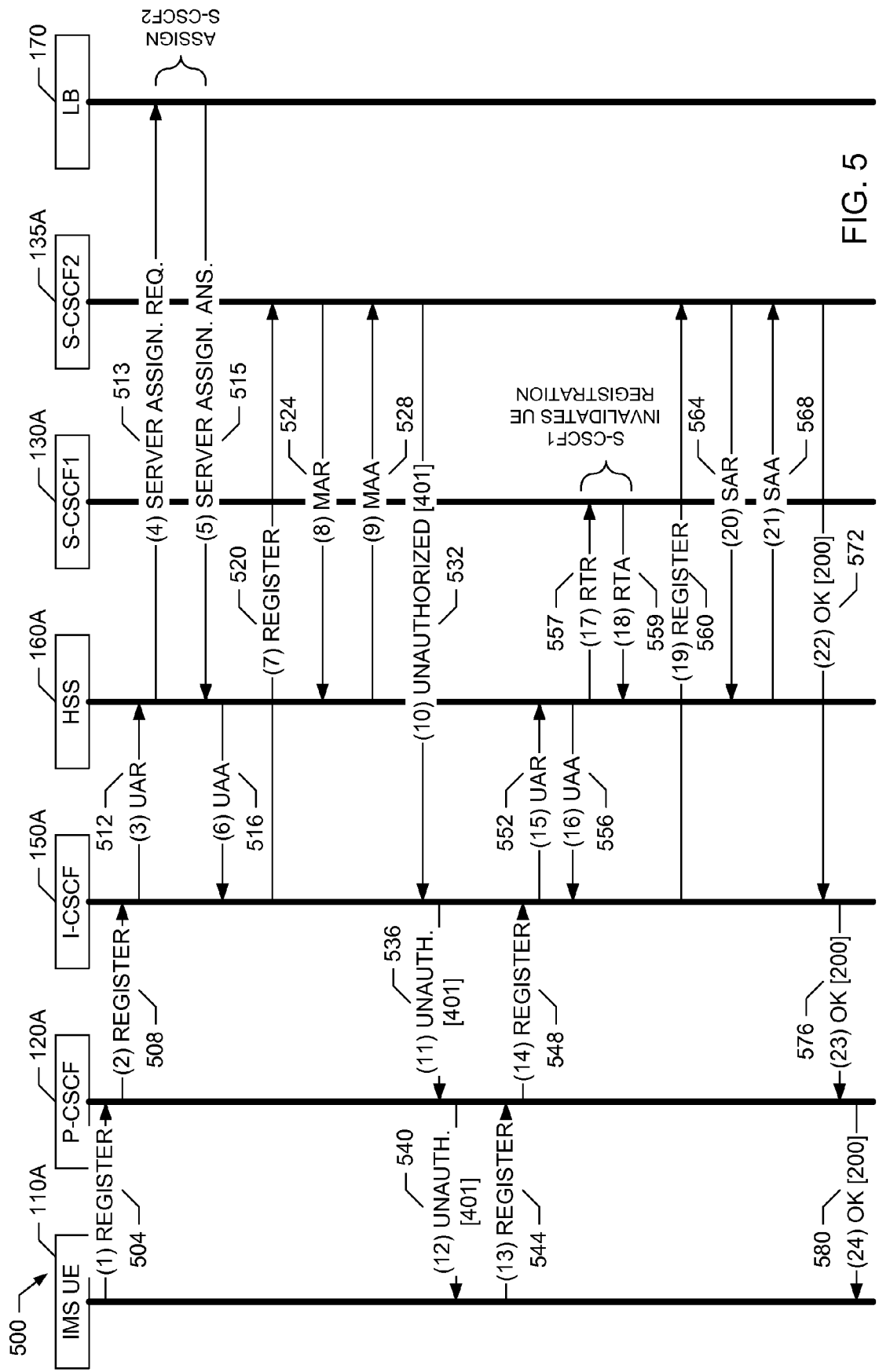
FIG. 5 is a message sequence diagram illustrating an example user device re-registration procedure employing load balancing that may be performed by the example communication network of FIG. 1.

A message sequence diagram 500 illustrating an example user device re-registration procedure employing load balancing that may be implemented by the example communication network 100 of FIG. 1 is shown in FIG. 5. In the example message sequence diagram 500, the user device 110A is already registered with the example communication network 100 and assigned to the S-CSCF 130A (e.g., in response to performing an initial registration procedure corresponding to the example message sequence diagram 400 of FIG. 4). In the illustrated example, the user device 110A is performing a re-registration procedure to maintain its registration with the example communication network 100 (e.g., based on authentication parameters provided during initial registration with the S-CSCF 130A).

With this in mind, the example message sequence diagram 500 begins with the user device 110A initiating a re-registration attempt with the communication network 110A by issuing a registration request 504 directed to its assigned S-CSCF 130A that is received by the P-CSCF 120A. For example, the registration request 504 may correspond to a SIP REGISTER request 504 from the user device 110A to the P-CSCF 120A. In prior art systems, the P-CSCF would then route the registration request 504 (e.g., such as a SIP REGISTER request 504) to the S-CSCF 130A already assigned to the user device 110A to perform the re-registration procedure. In contrast with such prior art implementations, the P-CSCF 120A of the illustrated example is configured to route the registration request 504 (e.g., such as a SIP REGISTER request 504) corresponding to the re-registration attempt to the I-CSCF 150A instead of the S-CSCF 130A.

Although the P-CSCF 120A could be configured to always route registration requests 504 (e.g., such as a SIP REGISTER requests 504) corresponding to re-registration attempts to the I-CSCF 150A, in a preferred implementation an exception is made when the user device 110A is in an active call session with an assigned S-CSCF (e.g., such as the S-CSCF 130A in the illustrated example). As such, in a preferred implementation, the P-CSCF 120A will route the registration request 504 (e.g., such as a SIP REGISTER request 504) corresponding to the re-registration attempt to the S-CSCF 130A already assigned to the user device 110A when the user device 110A is in an active call session with the S-CSCF 130A. In this way, the possibility of reassigning the user device 110A from the S-CSCF 130A to another S-CSCF and, thereby, potentially interrupting the active call session is avoided. However, if the user device 110A is not in an active call session (e.g., such as when the user device 110A is not yet registered with any S-CSCF, or is registered with an S-CSCF but can be re-assigned without potentially interrupting an active call session), the P-CSCF 120A will route the registration request 504 (e.g., such as a SIP REGISTER request 504) corresponding to the re-registration attempt to the I-CSCF 150A.

In the example message sequence diagram 500, the user device 110A is not in an active call session with the S-CSCF 130A. As such, the P-CSCF 120A continues routing the registration request to the I-CSCF 150A as a registration request 508. For example, the registration request 508 may correspond to another SIP REGISTER request 508 from the P-CSCF 120A to the I-CSCF 150A. To allow for a possible reassignment of the user device 110A to another S-CSCF to achieve a desirable load balancing, the I-CSCF 150A routes the registration request by sending an authentication request query to the HSS 160A. The I-CSCF 150A routes the registration request by sending an authentication request 512, such as a UAR command 512, to the HSS 160A to obtain an assignment of an appropriate S-CSCF to the user device 110A. Unlike prior art implementations, to permit dynamic load balancing, the S-CSCF to be assigned to the user device 110A may be the currently-assigned S-CSCF 130A or a newly assigned S-CSCF (e.g., such as the S-CSCF 135A) corresponding to an S-CSCF reassignment.

In response to the received authentication request 512 (e.g., such as the UAR command 512) corresponding to the user device 110A, the HSS 160A determines whether a load balancing procedure is already in progress for the user device 110A. The HSS 160A determines whether a load balancing procedure is in progress, for example, based on information stored in an assignment table. An example assignment table includes records for each user device undergoing an S-CSCF assignment or reassignment in accordance with a load balancing procedure already in progress. For example, a record is created for a user device and included in the assignment table when a user device is assigned an S-CSCF. The record is removed from the table once the user device completes registration with the assigned S-CSCF (and is de-registered from its currently-assigned S-CSCF, if appropriate). At this point in the example message sequence 500, no record exists for the user device 110A in the assignment table maintained by the HSS 160A. Therefore, in response to the received authentication request 512, the HSS 160A sends a query 513 to the load balancer 170 to obtain an S-CSCF assignment for the user device 110A. For example, the query 513 may take the form of a server assignment request 513.

In response to receiving the query 513 (e.g., such as the server assignment request 513), the load balancer 170 employs one or more load balancing algorithms as discussed above in connection with FIG. 2 to determine which S-CSCF to assign to the user device 110A. In the illustrated example, the load balancer 170 assigns S-CSCF 135A to the user device 110A, which corresponds to a reassignment of the user device 110A from its currently-assigned S-CSCF 130A to the newly-assigned S-CSCF 135A. Next, the load balancer 170 sends a query response 515, such as a server assignment answer 515, to the HSS 160A indicating the assignment of the S-CSCF 135A to the user device 110A. In response to receiving the query response 515 (e.g., such as the server assignment answer 515), the HSS 160A creates a record for the user device 110A. For example, the record may be of the form:

(user device, currently-assigned S-CSCF, newly-assigned S-CSCF).

In the illustrated example, the record created by the HSS 160A would be:

(user device 110A, S-CSCF 130A, S-CSCF 135A).

If, however, the user device 110A had not previously been assigned to any S-CSCF (e.g., if this was an initial registration for the device), a "NULL" indicator would be used to identify the currently assigned S-CSCF.

Continuing with the illustrated example, the HSS 160A creates a record for the user device 110A indicating the new assignment of the user device 110A to the S-CSCF 135A. Next, the HSS 160A sends an authentication answer 516, such as a UAA command 516, to the I-CSCF 150A indicating an assignment of the S-CSCF 135A to the user device 110A. The I-CSCF 150A, in turn, routes the registration request to the S-CSCF 135A as a registration request 520 using the assignment information included in the received authentication answer 516. For example, the registration request 520 may correspond to another SIP REGISTER request 520 from the I-CSCF 150A to the S-CSCF 135A. In response to receiving the registration request 520 corresponding to the user device 110A, the S-CSCF 135A sends an authentication request 524, such as an MAR command 324, to the HSS 160A to obtain security information for authenticating the user device 110A. The HSS 160A responds to the authentication request 524 (e.g., corresponding to the MAR command 524) with an authentication answer 528, such as an MAA command 528. The authentication answer 528 (e.g. corresponding to the MAA command 528) includes the requested security information associated with the user device 110A.

To cause the user device 110A to authenticate with the newly-assigned S-CSCF 135A to complete the re-registration process, the S-CSCF 135A returns an authentication challenge 532 to the I-CSCF 150A which includes security information for the user device 110A to perform authentication. For example, the authentication challenge 532 may correspond to a SIP 401 response 532 from the S-CSCF 130A to the I-CSCF 150A. The I-CSCF 150A, in turn, returns a similar authentication challenge 536 to the P-CSCF 120A. For example, the authentication challenge 536 may correspond to a SIP 401 response 536 from the I-CSCF 150A to the P-CSCF 120A. In response, the P-CSCF 120A returns another authentication challenge 540 to the user device 110A which includes the security information required for the user device 110A to perform authentication with the S-CSCF 135A. For example, the authentication challenge 540 may correspond to a SIP 401 response 540 from the P-CSCF 120A to the user device 110A.

Next, in response to receiving the authentication challenge 540 to its first registration request 504, the user device 110A substantially repeats the previous re-registration procedure. However, the procedure is now directed to the newly-assigned S-CSCF 135A and with the appropriate authentication information to enable authentication with the S-CSCF 135A. As such, the user device 110A issues another registration request 544 that is received by the P-CSCF 120A. For example, the registration request 544 may correspond to a SIP REGISTER request 544 from the user device 110A to the P-CSCF 120A. Next, the P-CSCF 120A routes the registration request to the I-CSCF 150A as a registration request 548. For example, the registration request 548 may correspond to another SIP REGISTER request 548 from the P-CSCF 120A to the I-CSCF 150A.

To complete authentication of the user device 110A with the assigned S-CSCF 130A, the I-CSCF 150A routes the registration request by sending an authentication request query to the HSS 160A. For example, the I-CSCF 150A may route the registration request by sending an authentication request 552, such as a UAR command 552, to the HSS 160A. In response to receiving the authentication request 552, the HSS 160A sends an authentication answer 556, such as a UAA command 556, to the I-CSCF 150A indicating the new assignment of the S-CSCF 135A to the user device 110A. Additionally, the HSS 160A determines whether a load balancing procedure is already in progress for the user device 110A. For example, the HSS 160A searches for a record in its assignment table corresponding to the user device 110A. In the illustrated example, at this point in the example message sequence 500 the HSS 160A finds the following record for the user device 110A:

(user device 110A, S-CSCF 130A, S-CSCF 135A).

This record indicates that the user device 110A is undergoing a re-assignment from the previously-assigned S-CSCF 130A to the newly-assigned S-CSCF 135A. As such, the user device 110A must be de-registered from the S-CSCF 130A.

To accomplish the de-registration of the user device 110A from the S-CSCF 130A, the HSS 160A sends a de-registration request 557 to the S-CSCF 130A. For example, the de-registration request 557 may correspond to a DIAMETER Registration Termination Request (RTR) command 557 with a reason code of "NEW_SERVER_ASSIGNED." In response to receiving the de-registration request 557 (e.g., such as the RTR command 557), the S-CSCF 130A invalidates its registration of the user device 110A. The S-CSCF 130A then sends a de-registration answer 559, such as a DIAMETER Registration Termination Answer (RTA) command 559, back to the HSS 160A indicating the successful de-registration of the user device 110A from the S-CSCF 130A. In response to receiving the de-registration answer 559 (e.g., such as the RTA command 559), the HSS 160A deletes the record corresponding to the user device 110A from its assignment table.

Additionally, in response to receiving the authentication answer 556 (e.g., such as the UAA command 556), the I-CSCF 150A, in turn, routes the registration request to the newly-assigned S-CSCF 135A as a registration request 560. For example, the registration request 560 may correspond to another SIP REGISTER request 560 from the I-CSCF 150A to the S-CSCF 135A. In response to receiving the registration request 560 with the appropriate authentication information corresponding to the user device 110A, the S-CSCF 135A sends an assignment request 564, such as an SAR command 564, to the HSS 160A. In the illustrated example, the assignment request 564 (e.g., corresponding to the SAR command 564) is a request to store the authenticated assignment of the S-CSCF 135A with the user device 110A. The HSS 160A responds to the assignment request 564 (e.g., corresponding to the SAR command 564) with an assignment answer 568, such as an SAA command 568. The authentication answer 568 (e.g. corresponding to the SAA command 568) includes information indicating that the authenticated assignment of the S-CSCF 135A with the user device 110A was successfully stored, as well as any other information that the S-CSCF 135A needs to provide service to the user device 110A.

In an alternative implementation, in response to receiving the authentication request 552 and then determining that a load balancing procedure is already in progress for the user device 110A, the HSS 160A may be configured to cause the user device 110A to register with the newly-assigned S-CSCF 135A before causing it to be de-registered from the previously-assigned S-CSCF 130A. In such an alternative implementation, the HSS 160A will send the de-registration request 557 to the S-CSCF 130A after sending the authentication answer 568 to the S-CSCF 135A indicating that the new assignment with the user device 110A was successful. In other words, in this alternative implementation, the de-registration request 557 and de-registration answer 559 would occur after the assignment request 564 and the assignment answer 568, rather than before the assignment request 564 and the assignment answer 568 as shown in the example message sequence diagram of FIG. 5.

Returning to the example of FIG. 5, to indicate the successful authentication of the user device 110A with the S-CSCF 135A, the S-CSCF 135A returns a positive final response 572 to the I-CSCF 150A which includes, for example, information for the user device 110A to maintain authentication by performing subsequent re-registrations at appropriate time intervals. For example, the positive final response 572 may correspond to a SIP 200 response 572 from the S-CSCF 135A to the I-CSCF 150A. The I-CSCF 150A, in turn, returns a similar positive final response 576 to the P-CSCF 120A. For example, the positive final response 576 may correspond to a SIP 200 response 576 from the I-CSCF 150A to the P-CSCF 120A. In response, the P-CSCF 120A returns another positive final response 580 to the user device 110A which indicates that authentication with the S-CSCF 135A was successful and which includes, for example, the information needed for the user device 110A to maintain authentication with the S-CSCF 135A. For example, the positive final response 580 may correspond to a SIP 200 response 580 from the P-CSCF 120A to the user device 110A. The user device 110A is then re-registered with the example communication network 100 and the example message sequence diagram 500 ends.

Figure 6A:
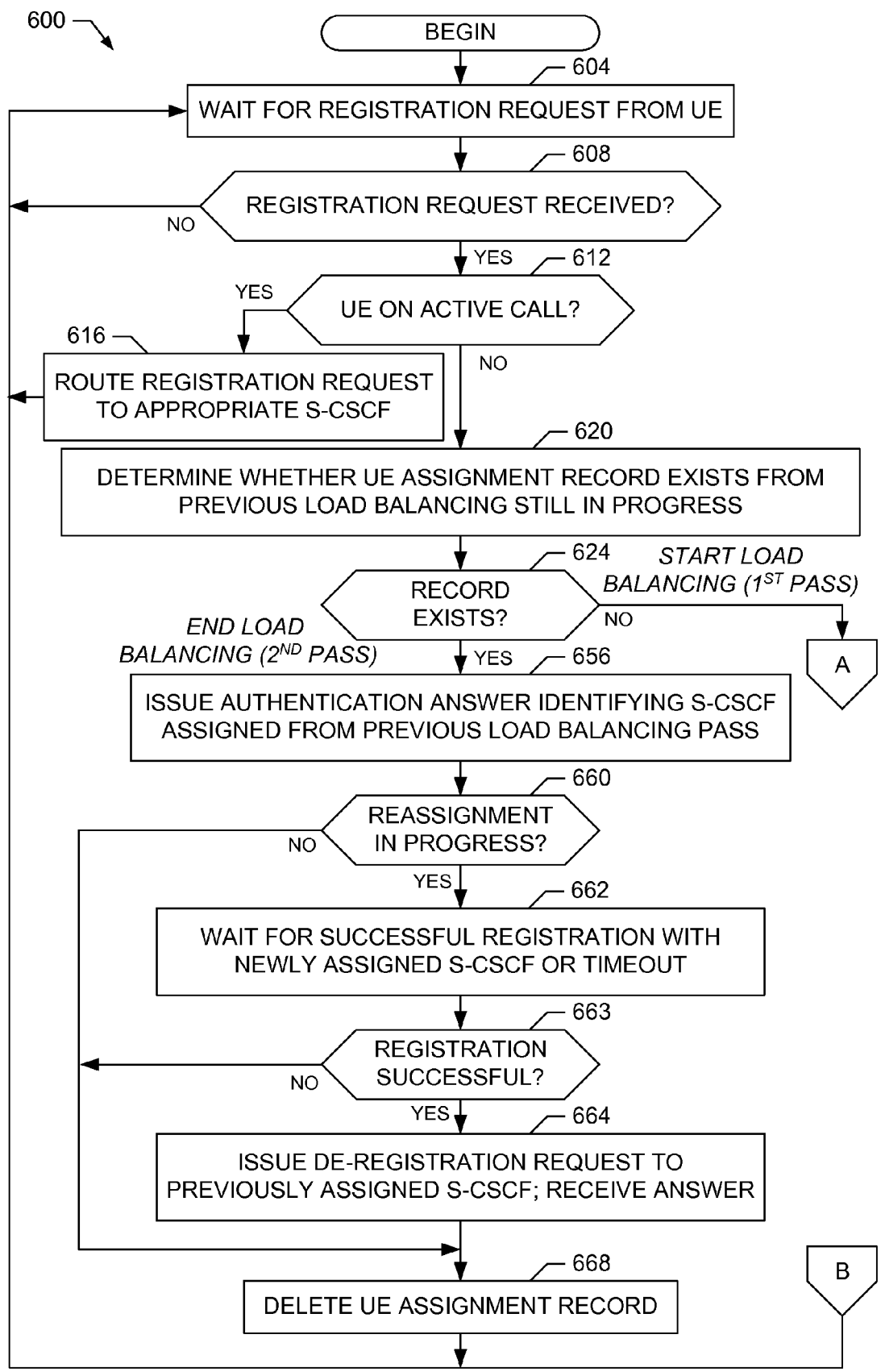
FIGS. 6A-6B collectively form a flowchart representative of example machine readable instructions that may be executed to perform load balancing to implement the example communication network of FIG. 1.
Figure 6B:
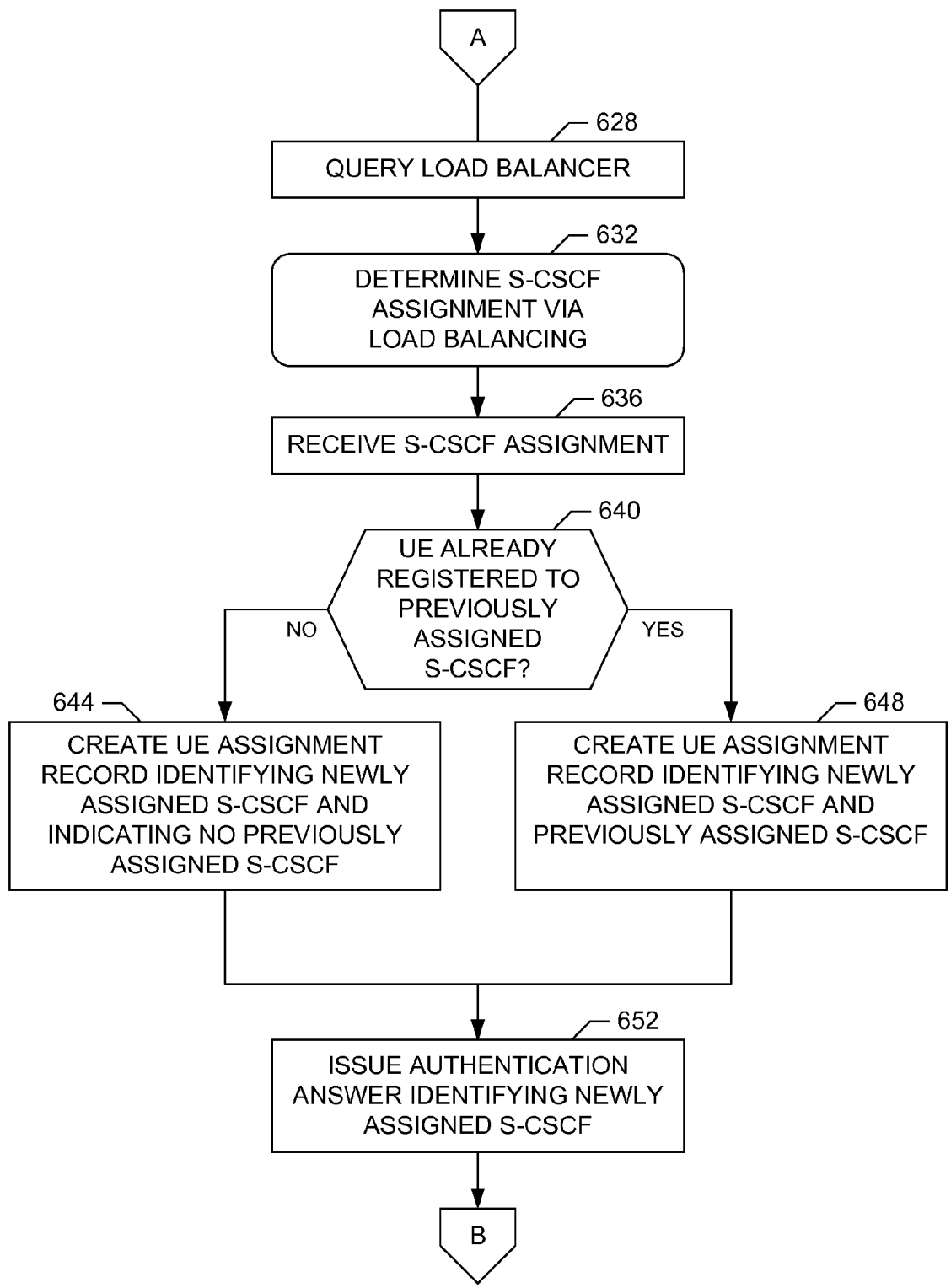
Figure 7:
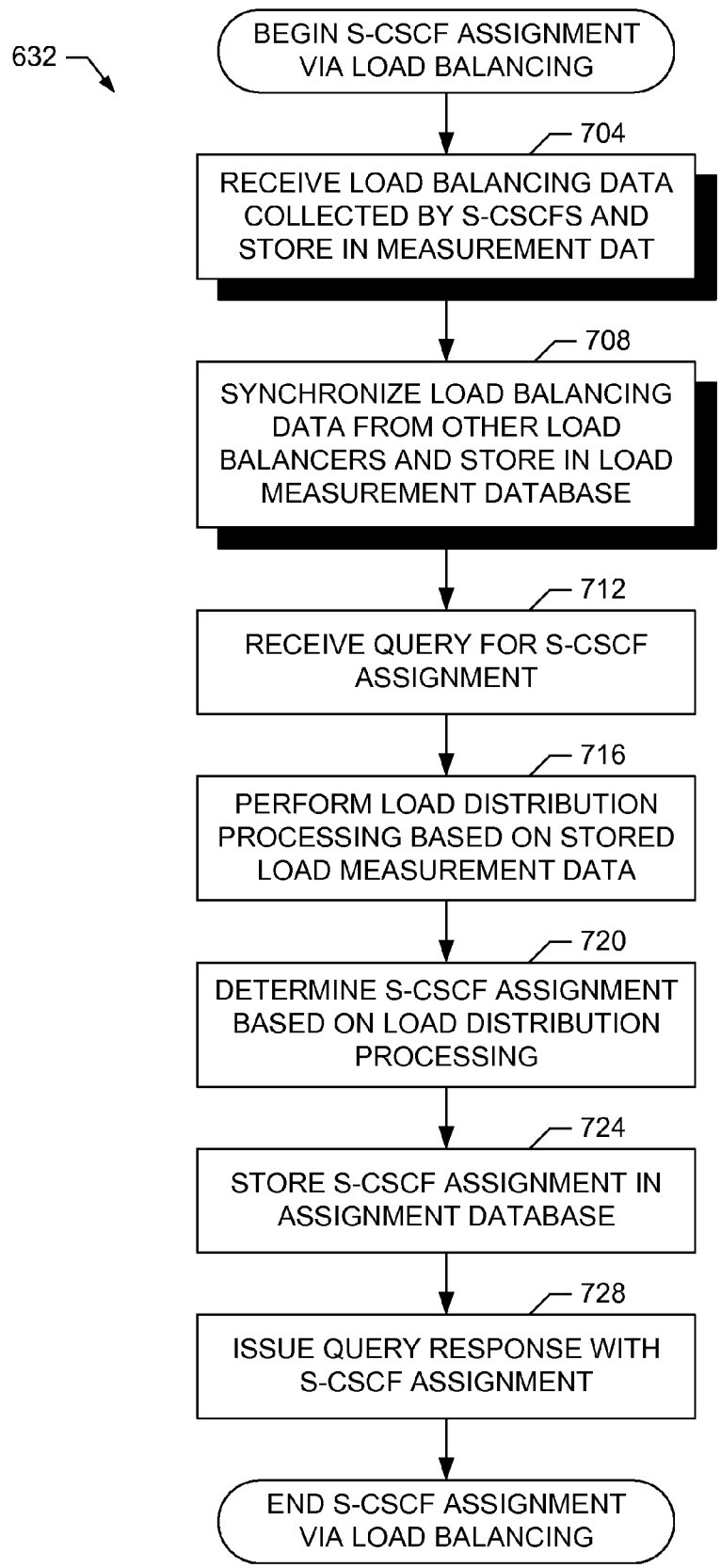
FIG. 7 is a flowchart representative of example machine readable instructions that may be executed to perform call processor assignment via load balancing to implement the example communication network of FIG. 1, the example load balancer of FIG. 2 and/or the example machine readable instructions of FIGS. 6A-6B.

Flowcharts representative of example machine readable instructions that may be executed to implement the example communication network 100, the example P-CSCFs 120A and/or 120B, the example HSSs 160A and/or 160B, the example load balancer 170, the example load balancer clients 180A and/or 180B, and/or the example load balancer data collectors 190A and/or 190B of FIG. 1, and/or the example load balancer 170, the example data receiver 210, the example load director 230, the example load distribution processor 240 and/or the example data synchronizer 260 of FIG. 2 are shown in FIGS. 6A-6B and 7. In these examples, the machine readable instructions represented by each flowchart may comprise one or more programs for execution by: (a) a processor, such as the processor 812 shown in the example computer 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but persons of ordinary skill in the art will readily appreciate that the entire program or programs and/or portions thereof could alternatively be executed by a device other than the processor 812 and/or embodied in firmware or dedicated hardware (e.g., implemented by an application specific integrated circuit (ASIC), a programmable logic device (PLD), a field programmable logic device (FPLD), discrete logic, etc.). For example, any or all of the example communication network 100, the example P-CSCFs 120A and/or 120B, the example HSSs 160A and/or 160B, the example load balancer 170, the example load balancer clients 180A and/or 180B, the example load balancer data collectors 190A and/or 190B, the example data receiver 210, the example load director 230, the example load distribution processor 240 and/or the example data synchronizer 260 could be implemented by any combination of software, hardware, and/or firmware. Also, some or all of the machine readable instructions represented by the flowchart of FIGS. 6A-6B and 7 may be implemented manually. Further, although the example machine readable instructions are described with reference to the flowcharts illustrated in FIGS. 6A-6B and 7, persons of ordinary skill in the art will readily appreciate that many other techniques for implementing the example methods and apparatus described herein may alternatively be used. For example, with reference to the flowcharts illustrated in FIGS. 6A-6B and 7, the order of execution of the blocks may be changed, and/or some of the blocks described may be changed, eliminated, combined and/or subdivided into multiple blocks.

Example machine readable instructions 600 that may be executed to implement load balancing in the example communication network 100 of FIG. 1 are shown in FIGS. 6A-6B. The example machine readable instructions 600 may be executed continuously by, for example, one or more elements of the example communication network 100. Without loss of generality, the execution of the machine readable instructions 600 is described from the perspective of the user device 110A operating in the example communication network 100. With this in mind, the machine readable instructions 600 begin execution at block 604 of FIG. 6A at which the P-CSCF 120A waits for a registration request (e.g., such as a SIP REGISTER request) from any user device in its receiving area. Such a registration request may correspond to an initial registration attempt or a re-registration attempt by, for example, the user device 110A. If at block 608 the P-CSCF 120A determines that a registration request has been received from, for example, the user device 110A, control proceeds to block 612.

At block 612, the P-CSCF 120A determines whether the user device 110A corresponding to the received registration request is in an active call session. If the P-CSCF 120A determines that the user device 110A is in an active call session (block 612), control proceeds to block 616 at which the P-CSCF 120A routes the registration request to the S-CSCF already assigned to the user device 110A and serving the active call session (e.g., such as the S-CSCF 130A). The P-CSCF 120A causes the registration request to be routed to the S-CSCF 130A already assigned to the user device 110A and serving the active call session to avoid any possibility of interrupting the call session through an S-CSCF reassignment. Control then returns to block 604 at which the P-CSCF 120A waits for another registration request (e.g., such as a SIP REGISTER request) from any user device in its receiving area.

If, however, the P-CSCF 120A determines that the user device 110A is not in an active call session (block 612), control proceeds to block 620. At block 620, the HSS 160A determines whether a load balancing procedure is already in progress for the user device 110A. For example, at block 620 the HSS 160A determines whether a record exists for the user device in an assignment table maintained by the HSS 160A. In an example implementation, a record is created for a user device and included in the assignment table when the user device is assigned an S-CSCF. The record is removed from the table once the user device completes registration with the assigned S-CSCF (and is de-registered from its currently-assigned S-CSCF, if appropriate). As discussed above in connection with FIG. 5, the record may be of the form:

(user device, currently-assigned S-CSCF, newly-assigned S-CSCF)

which indicates the identities of the user device (e.g., such as the user device 110A), its currently-assigned S-CSCF (which could be "NULL" if the user device is not yet registered with the network) and its newly-assigned S-CSCF.

Returning to FIG. 6A, if the HSS 160A determines that a record for the user device 110A does not exist in the assignment table (block 624), the registration request received at block 608 is a first registration request corresponding to an initial registration attempt or a re-registration attempt. Therefore, control proceeds to block 628 of FIG. 6B. At block 628, the HSS 160A queries the load balancer 170 to obtain an S-CSCF assignment for the user device 110A. For example, the HSS 160A may send a server assignment request to the load balancer 170 at block 628. Control then proceeds to block 632 at which the load balancer 170 determines an S-CSCF assignment for the user device 110A. For example, at block 632 the load balancer 170 may employ one or more load balancing algorithms as discussed above in connection with FIG. 2 to determine which S-CSCF to assign to the user device 110A. The load balancer 170 also sends the S-CSCF assignment back to the HSS 160A. Example machine readable instructions 632 that may be used to implement the processing at block 632 are shown in FIG. 7 and discussed in greater detail below.

After processing at block 632 completes, control proceeds to block 636 at which the HSS 160A receives the S-CSCF assignment from the load balancer 170. For example, the load balancer 170 may send a server assignment answer to the HSS 160A which indicates the assignment of an S-CSCF (e.g., such as the S-CSCF 130A or the S-CSCF 135A) to the user device 110A. Control then proceeds to block 640 at which the HSS 160A determines whether the user device 110A is already registered with a previously-assigned S-CSCF. If the user device 110A is not already registered with an S-CSCF (block 640), control proceeds to block 644 at which the HSS 160A creates an assignment record for the user device 110A corresponding to an initial registration attempt. In particular, the record created at block 644 will indicate that the user device 110A was not previously assigned to an S-CSCF and will identify the S-CSCF newly-assigned to the user device 110A. For example, assuming that the load balancer 170 had assigned the S-CSCF 130A to the user device 110A at block 632, an example record created by the HSS 160A at block 644 is:

user device 110A, NULL, S-CSCF 130A).

If, however, the user device 110A is already registered with an S-CSCF (block 640), control proceeds to block 648 at which the HSS 160A creates an assignment record for the user device 110A corresponding to a re-registration attempt. In particular, the record created at block 648 will indicate that the user device 110A was previously assigned to a first S-CSCF and will identify the second S-CSCF newly-assigned to the user device 110A. The first S-CSCF and the second S-CSCF may be the same or different S-CSCFs. For example, assuming that the user device 110A was already assigned to the S-CSCF 130A and that the load balancer 170 had assigned the S-CSCF 135A to the user device 110A at block 632, an example record created by the HSS 160A at block 648 is:

(user device 110A, S-CSCF 130A, S-CSCF 135A).

After execution at blocks 644 or 648 completes, control proceeds to block 652 at which the HSS 160A issues an authentication answer identifying the S-CSCF assigned to the user device 110A. The authentication answer is ultimately routed to the user device 110A. The user device 110A, in turn, will generate another registration request to authenticate with the assigned S-CSCF to, thereby, complete the initial registration or re-registration attempt. Control then returns to block 604 of FIG. 6A at which the P-CSCF 120A waits for this subsequent registration request from the user device 110A.

Returning to block 624 of FIG. 6A, if the HSS 160A determines that a record for the user device 110A exists in the assignment table (block 624), the registration request received at block 608 is a second registration request corresponding to the authentication phase of an initial registration attempt or a re-registration attempt, and control proceeds to block 656. At block 656, the HSS 160A issues an authentication answer identifying an S-CSCF that was just assigned to the user device 110A during an immediately previous execution of block 632 of FIG. 6B corresponding to the user device 110A. The HSS 160A determines the identity of the newly-assigned S-CSCF based on information included in the assignment record for the user device 110A. For example, assuming that user device 110 has not completed registration with the communication network 100 and the load balancer 170 had assigned the S-CSCF 130A to the user device 110A during an immediately previous execution of block 632 of FIG. 6B, an example record processed at block 656 for the user device 110A is:

user device 110A, NULL, S-CSCF 130A).

As another example, assuming that the user device 110A was already assigned to the S-CSCF 130A and that the load balancer 170 had assigned the S-CSCF 135A to the user device 110A during an immediately previous execution of block 632, an example record processed at block 656 for the user device 110A is:

(user device 110A, S-CSCF 130A, S-CSCF 135A).

The resulting authentication answer issued by the HSS 160A at block 656 causes the user device 110A to complete authentication with its newly-assigned S-CSCF.

Next, control proceeds to block 660 at which the HSS 160A determines whether the user device 110A is undergoing an S-CSCF reassignment from a previously-assigned S-CSCF to a newly-assigned S-CSCF. For example, at block 660 the HSS 160A may process the assignment record corresponding to the user device 110A to determine whether an S-CSCF reassignment is in progress. In particular, if the currently-assigned S-CSCF and the newly-assigned S-CSCF fields in the assignment record are different and the currently assigned S-CSCF field is not "NULL," then the user device 110A is undergoing an S-CSCF reassignment. Otherwise, the user device 110A is either being initially assigned to an S-CSCF or is re-registering to its currently assigned S-CSCF.

If the HSS 160A determines that the user device 110A is undergoing an S-CSCF reassignment (block 660), control proceeds to block 662 at which the HSS 160A waits for an indication that the reassignment of the user device 110A to the newly-assigned S-CSCF was successful or if a timeout period has expired. For example, at block 662 the HSS 160A may be configured to wait for the receipt of an assignment request requesting that the HSS 160A store the authenticated assignment of the newly-assigned S-CSCF with the user device 110A. If at block 663 the HSS 160A determines that the re-assignment of the user device 110A with the newly-assigned S-CSCF was successful (e.g., the authentication request was received prior to expiration of the timeout period), control proceeds to block 664. At block 664, the HSS 160A issues a de-registration request to the S-CSCF to which the user device 110A was previously registered. For example, at block 664 the load balancer client 180A associated with the HSS 160A may send a de-registration request (e.g., such as an RTR command) to the S-CSCF to which the user device 110A was previously registered. De-registration is successful when the HSS 160A receives a response from the S-CSCF indicating that its registration of the user device 110A was invalidated.

After processing at block 664 completes, or if the HSS 160A determines that the re-registration of the user device 110A with the newly-assigned S-CSCF was unsuccessful (block 663), or if the HSS 160A determines that the user device 110A is not undergoing an S-CSCF reassignment (block 660), control proceeds to block 668. At block 668, the HSS 160A deletes the record for the user device 110A from its assignment database. Control then returns to block 604 at which the P-CSCF 120A waits for another registration request (e.g., such as a SIP REGISTER request) from any user device in its receiving area.

Example machine readable instructions 632 that may be used to perform S-CSCF assignment via load balancing to implement the processing at block 632 of FIG. 6B are shown in FIG. 7. Without loss of generality, the execution of the machine readable instructions 632 of FIG. 7 is described from the perspective of the user device 110A operating in the example communication network 100. With this in mind, the machine readable instructions 632 of FIG. 7 begin execution at block 704 at which the load balancer 170 receives performance data collected by the S-CSCFs 130A, 130B, 135A and 135B. For example, at block 704 the data receiver 210 included in the example load balancer 170 of FIG. 2 receives performance data collected by the load balancer data collectors 190A, 190B, 195A and 195B associated, respectively, with the S-CSCFs 130A, 130B, 135A and 135B. Furthermore, the performance data received by the data receiver 210 is then stored in, for example, the measurement database 220 for subsequent processing. In a preferred implementation, the processing at block 704 occurs in parallel to and autonomously from the other processing performed by the example machine readable instructions 632 (which is indicated by the shading of block 704 in FIG. 7).

Next, control proceeds to block 708 at which the load balancer 170 synchronizes its stored performance data with performance data collected by other load balancers 170 in the communication network 100. For example, at block 708 the data synchronizer 260 included in the example load balancer 170 of FIG. 2 may provide performance data stored in the measurement database 220 to one or more other load balancers 170 in the communication network 100. Additionally or alternatively, at block 708 the data synchronizer 260 may obtain performance data from one or more other load balancers 170 in the communication network 100 for storage in the measurement database 220. In a preferred implementation, the processing at block 708 occurs in parallel to and autonomously from the other processing performed by the example machine readable instructions 632 (which is indicated by the shading of block 708 in FIG. 7).

Control next proceeds to block 712 at which the load balancer 170 receives a query (e.g., in the form of a server assignment request) from the HSS 160A to obtain an S-CSCF assignment for the user device 110A. For example, at block 712 the load director 230 included in the example load balancer 170 of FIG. 2 may receive the assignment request from the load balancer client 180A associated with the HSS 160A. Control then proceeds to block 716 at which the load balancer 170 performs load distribution processing based on the performance data stored in, for example, the measurement database 220. For example, at block 716 the load distribution processor 240 included in the example load balancer 170 of FIG. 2 may implement any load distribution algorithm or algorithms to process the performance data stored in the measurement database 220 to determine how to assign S-CSCFs to particular user devices. For example, the load distribution processor 240 may determine candidate S-CSCFs to assign to the user device 110A based on a load balancing algorithm that, for example, balances the loading of the various S-CSCFs in the example communication network 100 as measured by performance data corresponding to any or all of a number of registered accounts, a number of connections, a call arrival rate, a utilization percentage, etc., and/or any combination thereof.

After the load distribution processing completes at block 716 and a set of S-CSCF candidates for assignment to the user device 110A is determined, control proceeds to block 720. At block 720, the load balancer 170 determines which of the S-CSCF candidates will be assigned to the user device 110A. For example, at block 720 the load distribution processor 240 may bias assignment of the candidate S-CSCFs to the user device 110A based on certain configurable preferences. For example, the load distribution processor 240 may be configured to bias its S-CSCF assignments such that an S-CSCF to which the user device 110A is already assigned is preferred over assignment of the user device 110A to another S-CSCF. Under such a configuration, the load distribution processor 240 will access assignment data corresponding to the user device 110A from, for example, the assignment database 250. The load distribution processor 240 will then attempt to reassign the user device 110A to its already-assigned S-CSCF unless, for example, that S-CSCF is currently overloaded. In another example, the load distribution processor 240 may be configured to bias its S-CSCF assignments such that the user device 110A is assigned to an S-CSCF in its home realm, if possible (e.g., if an S-CSCF in the home realm is not currently overloaded). To support such a configuration, information identifying which S-CSCFs are located in the home realm of the user device 110A may also be stored in the assignment database 250.

After the load balancer 170 assigns an S-CSCF to the user device 110A at block 720, control proceeds to block 724 at which the load balancer 170 stores information describing the assignment in, for example, the assignment database 250. For example, at block 724 the load distribution processor 240 included in the example load balancer 170 of FIG. 2 may store in the assignment database 250 the information describing the assignment of the user device 110A to the S-CSCF determined at block 724. Then, control proceeds to block 728 at which the load balancer 170 sends a query response (e.g., in the form of a server assignment answer) to the HSS 160A to indicate the S-CSCF assignment for the user device 110A. For example, at block 728 the load director 230 included in the example load balancer 170 of FIG. 2 may send an assignment answer to the load balancer client 180A associated with the HSS 160A indicating the S-CSCF assignment determined at block 720. Execution of the example machine readable instructions 632 (with the exception of the possible continued autonomous processing of blocks 704 and 708) then ends.

Figure 8:
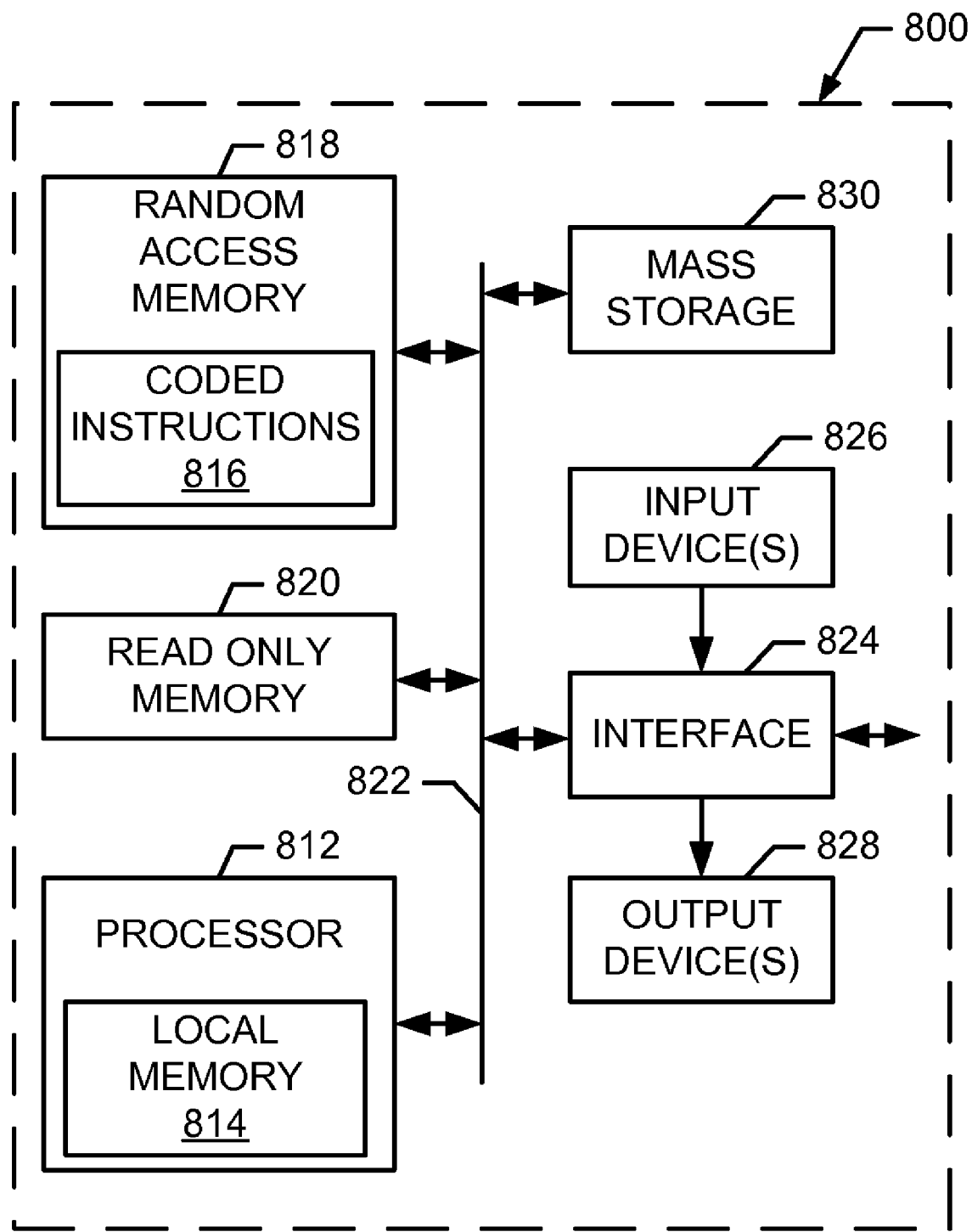
FIG. 8 is a block diagram of an example computer that may execute the example machine readable instructions of FIGS. 6A-6B and/or 7 to implement the example communication network of FIG. 1 and/or the example load balancer of FIG. 2.

FIG. 8 is a block diagram of an example computer 800 capable of implementing the apparatus and methods disclosed herein. The computer 800 can be, for example, a server, a personal computer, a personal digital assistant (PDA), an Internet appliance, a DVD player, a CD player, a digital video recorder, a personal video recorder, a set top box, or any other type of computing device.

The system 800 of the instant example includes a processor 812 such as a general purpose programmable processor. The processor 812 includes a local memory 814, and executes coded instructions 816 present in the local memory 814 and/or in another memory device. The processor 812 may execute, among other things, the machine readable instructions represented in FIGS. 6A-6B and 7. The processor 812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The computer 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device (s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 800 also includes one or more mass storage devices 830 for storing software and data. Examples of such mass storage devices 830 include floppy disk drives, hard drive disks, compact disk drives and digital versatile disk (DVD) drives. The mass storage device 830 may implement the measurement database 220 and/or the assignment database 250 of FIG. 2. Alternatively, the volatile memory 818 may implement the measurement database 220 and/or the assignment database 250.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to perform load balancing in a communication network comprising:
   in response to receiving a registration request for a user device that is registered with a first call processor in an Internet protocol multimedia subsystem network, determining whether the user device is in an active call session with the first call processor;
   routing the registration request to the first call processor if the user device is determined to be in the active call session with the first call processor;
   querying a load balancer to determine whether to assign the user device to at least one of the first call processor or a second call processor if the user device is determined to not be in any active call sessions with the first call processor; and
   causing the first call processor to de-register the user device in response to determining that a subsequent registration request for the user device is associated with a pending load balancing reassignment of the user device from the first call processor to the second call processor.

2. A method as defined in claim 1 wherein querying the load balancer occurs in response to the registration request.

3. A method as defined in claim 1 wherein the registration request is directed to the first call processor and further comprising routing the registration request to a home subscriber server instead of the first call processor when the user device is registered with the first call processor but not in any active call sessions with the first call processor, wherein the home subscriber server is configured to query the load balancer in response to the registration request.

4. A method as defined in claim 3 wherein the registration request comprises a first session initiation protocol register request, routing the registration request to the first call processor comprises sending a second session initiation protocol register request to the first call processor in response to the first session initiation protocol register request, and routing the registration request to the home subscriber server instead of the first call processor comprises sending a user authentication request to the home subscriber server.

5. A method as defined in claim 1 further comprising:
   routing the registration request to the second call processor instead of the first call processor to begin registering the user device with the second call processor; and
   sending a de-registration request to the first call processor, wherein routing the registration request to the second call processor and sending the de-registration request to the first call processor occur in response to a determination by the load balancer to assign the user device to the second call processor.

6. A method as defined in claim 5 wherein the registration request comprises a first session initiation protocol register request, routing the registration request to the second call processor comprises sending a second session initiation protocol register request to the second call processor, and sending a de-registration request to the first call processor comprises sending a registration termination request to the first call processor.

7. A method as defined in claim 5 wherein the registration request is a first registration request, and wherein sending the de-registration request to the first call processor occurs in response to a second registration request from the user device directed to the second call processor to complete registration of the user device with the second call processor.

8. A method as defined in claim 1 wherein the load balancer determines whether to assign the user device to the at least one of the first call processor or the second call processor based on at least one of a number of registered accounts, a number of connections, a call arrival rate, a utilization percentage or historical data associated with each one of the first call processor and the second call processor.

9. A method as defined in claim 1 further comprising providing performance data from the first call processor and the second call processor to the load balancer for processing by the load balancer to determine whether to assign the user device to the at least one of the first call processor or the second call processor.

10. A method as defined in claim 1 further comprising querying the load balancer to determine whether to assign the user device to the first call processor when the user device is not registered with any call processor.

11. A tangible storage device or optical disk storing machine readable instructions which, when executed, cause a machine to perform a method comprising: in response to receiving a registration request for a user device that is registered with a first call processor in an Internet protocol multimedia subsystem network, determining whether the user device is in an active call session with the first call processor; routing the registration request to the first call processor if the user device is determined to be in the active call session with the first call processor; querying a load balancer to determine whether to assign the user device to at least one of the first call processor or a second call processor if the user device is determined to not be in the active call session with the first call processor; and causing the first call processor to de-register the user device in response to determining that a subsequent registration request for the user device is associated with a pending load balancing reassignment of the user device from the first call processor to the second call processor.

12. A storage device or optical disk as defined in claim 11 wherein the registration request is directed to the first call processor and wherein the machine readable instructions, when executed, further cause the machine to route the registration request to a home subscriber server instead of the first call processor when the user device is registered with the first call processor but not in any active call sessions with the first call processor.

13. A storage device or optical disk as defined in claim 11 wherein the machine readable instructions, when executed, further cause the machine to: route the registration request to the second call processor instead of the first call processor to begin registering the user device with the second call processor; and send a de-registration request to the first call processor, wherein routing the registration request to the second call processor and sending the de-registration request to the first call processor occur in response to a determination by the load balancer to assign the user device to the second call processor.

14. A system for load balancing in a communication network, the system comprising:
    memory to store first and second machine readable instructions;
    a proxy call processor to execute the first machine readable instructions to:
        in response to receiving a registration request for a user device that is registered with a first one of a plurality of serving call processors in an Internet protocol multimedia subsystem network, determine whether the user device is in an active call session with the first one of the plurality of serving call processors; and
    a load balancer processor to execute the second machine readable instructions to collect respective performance data from the plurality of serving call processors, wherein if the user device is determined to not be in the active call session with the first one of the plurality of serving call processors, the proxy call processor is to route the registration request to the load balancer processor and the load balancer processor is to determine whether to assign the user device to the first one or the second one of the plurality of serving call processors in response to the registration request; and
    a home subscriber server to cause the first one of the plurality of call processors to de-register the user device in response to determining that a subsequent registration request for the user device is associated with a pending load balancing reassignment of the user device from the first one of the plurality of call processors to the second one of the plurality of call processors.

15. A system as defined in claim 14 wherein the proxy call processor is further to route the registration request to the first one of the plurality of serving call processors if the user device is determined to be in the active call session with the first one of the plurality of serving call processors.

16. A system as defined in claim 14 wherein the proxy call processor is further to route the registration request to the home subscriber server when the user device is registered with the first one of the plurality of serving call processors but not in any active call sessions with any of the plurality of serving call processors, and the home subscriber server is to cause the load balancer processor to determine whether to assign the user device to the first one or the second one of the plurality of serving call processors in response to the registration request.

17. A system as defined in claim 16 wherein the home subscriber server is to store information corresponding to the reassignment of the user device from the first one of the plurality of serving call processors to the second one of the plurality of serving call processors when the load balancer processor returns an assignment of the user device to the second one of the plurality of serving call processors.

18. A system as defined in claim 17 wherein the home subscriber server is further to send a de-registration request to the first one of the plurality of serving call processors based on the stored information.

19. A system as defined in claim 17 wherein the home subscriber server is further to route the registration request to the second one of the plurality of serving call processors based on the stored information when the load balancer processor returns an assignment of the user device to the second one of the plurality of serving call processors.

* * * * *